United States Patent
Kim

(10) Patent No.: US 7,125,618 B2
(45) Date of Patent: Oct. 24, 2006

(54) HYDROGEN SUPPLY SYSTEM FOR A FUEL CELL

(75) Inventor: Seong Kyun Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 562 days.

(21) Appl. No.: 10/608,946

(22) Filed: Jun. 26, 2003

(65) Prior Publication Data
US 2004/0115493 A1   Jun. 17, 2004

(30) Foreign Application Priority Data
Dec. 13, 2002   (KR) ...................... 10-2002-0079573

(51) Int. Cl.
*H01M 8/04* (2006.01)
(52) U.S. Cl. ........................ 429/13; 429/17; 429/20; 422/198
(58) Field of Classification Search ................ 422/198; 429/13, 17, 20
See application file for complete search history.

(56) References Cited

U.S. PATENT DOCUMENTS 5,900,330 A * 5/1999 Kagatani ..................... 429/17
6,294,276 B1   9/2001 Ogino
6,465,118 B1 * 10/2002 Dickman et al. ............. 429/20
6,946,104 B1 * 9/2005 Rusta-Sallehy et al. ..... 422/198

FOREIGN PATENT DOCUMENTS

| JP | 05-211066 | 8/1993 |
|----|-----------|--------|
| JP | 2002-080202 A1 | 3/2002 |
| JP | 2002-222658 | 9/2002 |

* cited by examiner

Primary Examiner—Gregg Cantelmo
Assistant Examiner—Alix Echelmeyer
(74) Attorney, Agent, or Firm—Morgan Lewis & Bockius LLP

(57) ABSTRACT

A hydrogen supply system is provided for a fuel cell that can increase the cooling water temperature without hydrogen consumption at ignition by increasing the temperature of the cooling water by using heat from a reaction between a hydride and water.

8 Claims, 2 Drawing Sheets

HYDROGEN SUPPLY SYSTEM FOR A FUEL CELL

FIELD OF THE INVENTION

This invention relates to a hydrogen supply system for a fuel cell, and more particularly, to a hydrogen supply system for a fuel cell capable of improving ignition performance at a low temperature and decreasing hydrogen consumption rate during the ignition.

BACKGROUND OF THE INVENTION

A fuel cell is like a battery that converts chemical energy originating from fuel oxidation to electric energy. In a hydrogen-oxygen fuel cell system, the hydrogen can be replaced with a gas fuel including methane and liquefied natural gas, or replaced with a liquid fuel including methanol.

In order to obtain power from a fuel cell stack of the fuel cell system, the temperature of the fuel cell stack must be more than a predetermined temperature, for example 50° C. If the temperature of the fuel cell stack is lower than the predetermined temperature, a membrane or a separating board of the fuel cell can be damaged, i.e. the temperature of the fuel cell increases rapidly so that thermal shock can occur. Accordingly, the efficiency of the fuel cell deteriorates.

Furthermore, although the relative humidity of the hydrogen, which is supplied at ambient temperature, is controlled to be 100%, as the reaction temperature inside of the fuel cell stack increases, the relative humidity of the hydrogen decreases, again deteriorating the efficiency of the fuel cell.

In a fuel cell system, methods for increasing reaction temperature and cooling water temperature are suggested as follows.

(1) Increasing the cooling water temperature by hydrogen combustion (2) Increasing the cooling water temperature by methanol combustion (3) Using an EHC (Electric Heated Catalyst)

(4) Increasing the reaction temperature by a reaction of hydrogen with oxygen near the MEA (Membrane Electrode Assembly)

The method of hydrogen or methanol combustion can easily increase the cooling water temperature by the heat of combustion. However, the methods of hydrogen or methanol combustion necessitate fuel consumption, so that the fuel consumption rate increases considerably. Furthermore, this method of hydrogen combustion has an associated danger of explosion.

The method of using an EHC (Electric Heated Catalyst) has a simple construction, but it has a defect in that a large quantity of electricity is consumed.

Finally, the method of using the reaction between hydrogen and oxygen near the MEA (Membrane Electrode Assembly) increases the reaction temperature rapidly so that the power is generated quickly, but an electrode catalyst can be damaged by thermal shock.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Therefore, the motivation for the present invention is to provide a hydrogen supply system for a fuel cell which can increase the cooling water temperature without hydrogen consumption at ignition.

The hydrogen supply system for a fuel cell according to a preferred embodiment of the present invention includes a hydrogen storage unit storing hydrogen and a hydride storage unit storing aqueous hydride. The hydrogen supply system also includes a reactor or gas separator supplied with aqueous hydride from the hydride storage unit. The reactor/gas separator is configured to react the supplied aqueous hydride to generate oxide and hydrogen. The system also includes a heat exchanger that is supplied with hydrogen from the reactor/gas separator. The heat exchanger is configured to transfer heat contained in the supplied hydrogen to a coolant circulating through a fuel cell stack. The system also preferably includes a regenerator supplied with oxide from the reactor/gas separator and hydrogen from the hydrogen storage unit. The regenerator reacts the supplied oxide and hydrogen to generate an aqueous hydride.

A control unit receiving a signal from a temperature detector controls three valves. A first valve is disposed inline between the hydrogen storage unit and the fuel cell stack. The first valve controls a supply of the hydrogen from the hydrogen storage unit to the fuel cell stack. A second valve disposed is disposed inline between the hydrogen storage unit and the regenerator. The second valve controls a supply of the hydrogen from the hydrogen storage unit to the regenerator. A third valve is disposed inline between the heat exchanger and the fuel cell stack. The third valve controls a supply of the hydrogen from the heat exchanger to the fuel cell stack. The temperature detector is configured to detect a temperature of the coolant flowing to the fuel cell stack and to generate a corresponding temperature signal. The control unit generates control signals for actuating the first valve, the second valve, and the third valve based on the temperature signal from the temperature detector. Preferably, when the coolant temperature is higher than a predetermined temperature, the control unit opens the first valve and closes the second valve and the third valve. Likewise, when the coolant temperature is lower than a predetermined temperature, the control unit closes the first valve and opens the second valve and the third valve.

In other words, the invention provides a method for controlling the temperature of a hydrogen fuel cell. The temperature of a coolant flowing to a fuel cell stack is calculated. Thereafter, if it is determined that the temperature of the coolant is higher than a predetermined temperature, oxide and hydrogen are generated from an aqueous hydride. Heat contained in the hydrogen is then exchanged with the coolant to raise the temperature of the fuel cell stack. Thereafter, if the temperature of the coolant is lower than the predetermined temperature, aqueous hydride is regenerated from the oxide and from hydrogen.

The aqueous hydride is preferably one of aqueous sodium borohydride ($NaBH_4$), aqueous lithium borohydride ($LiBH_4$), and aqueous sodium hydride ($NaH$).

BRIEF DESCRIPTION OF THE DRAWINGS

The accompanying drawings, which are incorporated in and constitute a part of the specification, illustrate an embodiment of the invention, and together with the description serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
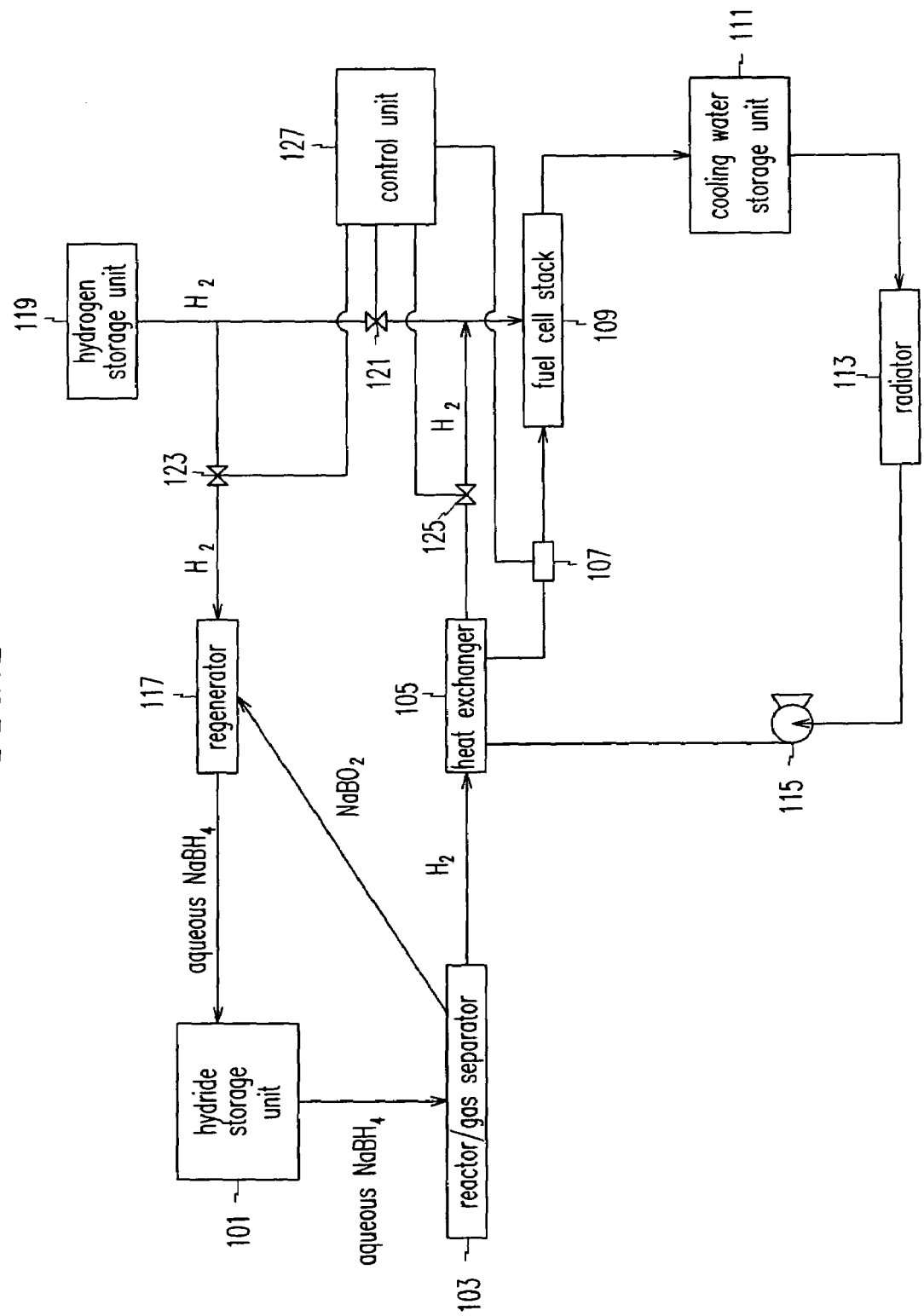
FIG. 1 is a block diagram showing a hydrogen supply system for a fuel cell according to a preferred embodiment of the present invention.

As shown in FIG. 1, a hydrogen supply system for a fuel cell has a hydride storage unit 101, which stores aqueous hydrides. A hydride is a compound that generates hydrogen and emits heat during reaction with water. A representative example of the hydride may be one of sodium borohydride ($NaBH_4$), lithium borohydride ($LiBH_4$), and sodium hydride (NaH). Sodium borohydride ($NaBH_4$) is used as the hydride in the present embodiment, but it is understood that the hydride element is not limited to $NaBH_4$.

A reactor/gas separator 103 is supplied with aqueous sodium borohydride ($NaBH_4$) from the hydride storage unit 101. Accordingly, the sodium borohydride ($NaBH_4$) reacts with water in the reactor/gas separator 103 so that sodium metaborate ($NaBO_2$), hydrogen ($H_2$), and heat are generated during the reaction.

A formula that represents the chemical reaction in the reactor/gas separator 103 is defined as follows.

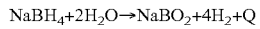

$$NaBH_4 + 2H_2O \rightarrow NaBO_2 + 4H_2 + Q$$

In the formula, Q is the heat generated during the reaction. A portion of the heat Q is absorbed by the hydrogen.

Furthermore, the reactor/gas separator 103 separates sodium metaborate ($NaBO_2$) and hydrogen ($H_2$) so that sodium metaborate ($NaBO_2$) is supplied to the regenerator 117, and hydrogen ($H_2$) is supplied to a heat exchanger 105 through which it passes.

Preferably, the reactor/gas generator 103 has a catalyst that causes a reaction to the aqueous sodium borohydride ($NaBH_4$). The catalyst can be one such as Platinum (Pt) or Ruthenium (Ru).

High temperature heat from the hydride, which is generated in the reactor/gas separator 103, is transferred to the cooling water while the hydrogen passes through the heat exchanger 105. The cooling water circulates through the fuel cell stack 109, a cooling water storage unit 111, a radiator 113, a cooling water pump 115, and the heat exchanger 105.

The regenerator 117 generates aqueous sodium borohydride ($NaBH_4$) by reaction between sodium metaborate ($NaBO_2$) supplied from the reactor/gas separator 103, and the hydrogen ($H_2$) supplied from the hydrogen storage unit 119.

A formula representing the chemical reaction in the regenerator 117 is defined as follows.

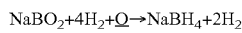

$$NaBO_2 + 4H_2 + Q \rightarrow NaBH_4 + 2H_2$$

Sodium borohydride ($NaBH_4$) generated in the regenerator 117 is supplied to the hydride storage unit 101.

A first valve 121 is mounted inline between the hydrogen storage unit 119 and the fuel cell stack 109. A second valve 123 is mounted inline between the hydrogen storage unit 119 and the regenerator 117. A third valve 125 is mounted inline between the heat exchanger 105 and the fuel cell stack 109. The first valve 121, the second valve 123, and the third valve 125 are operated by the control signal from a control unit 127 so that they close or open the valves. For example, the first valve 121, the second valve 123, and the third valve 125 can be solenoid valves operated by electric signals.

The control unit 127 receives a temperature signal from a temperature detector 107, which detects the temperature of the cooling water flowing from the heat exchanger 105 to the fuel cell stack 109, and controls actuation of the first valve 121, the second valve 123, and the third valve 125 based on this temperature signal.

Figure 2:
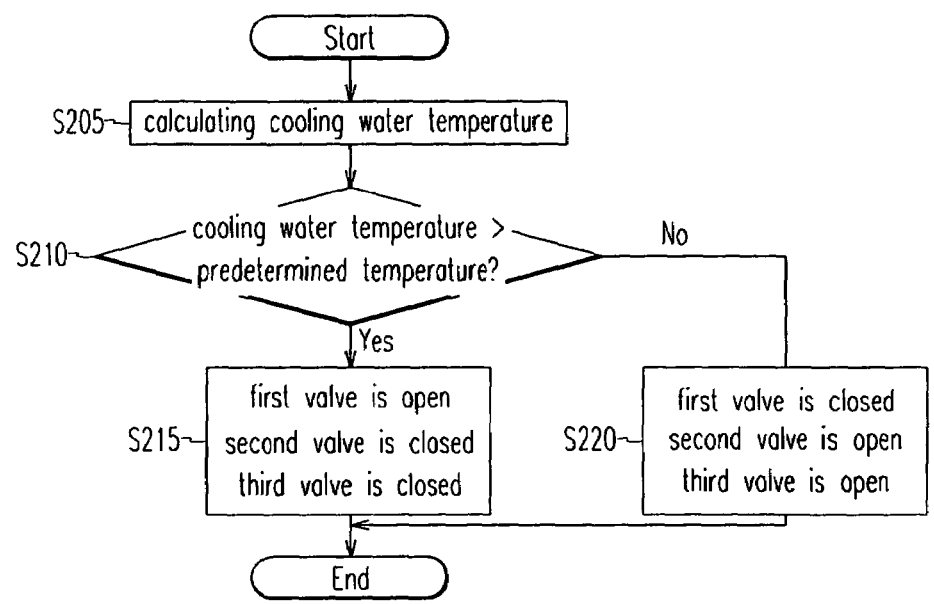
FIG. 2 is a flow chart showing a hydrogen supply method for a fuel cell.

As shown in FIG. 2, the control unit 127 (FIG. 1) calculates the cooling water temperature based on a temperature signal received from the temperature detector 107 (S205). The control unit 127 (FIG. 1) then determines whether the detected temperature of the cooling water is higher than a predetermined temperature (S210). Preferably, the predetermined temperature is set to a temperature at which the chemical reaction in the fuel cell stack easily occurs. For example, the predetermined temperature can be 50° C.

Where the calculated temperature of the cooling water is higher than the predetermined temperature (S210-Yes), the control unit 127 (FIG. 1) opens the first valve 121 (FIG. 1), and closes the second valve 123 (FIG. 1) and the third valve 125 (S215). When the first valve 121 (FIG. 1) is open and the second valve 123 (FIG. 1) and the third valve 125 are closed, the hydrogen in the hydrogen storage unit 119 (FIG. 1) is supplied directly to the fuel cell stack 109 (FIG. 1). That is to say, if the calculated temperature of the cooling water is higher than the predetermined temperature, the control unit 127 (FIG. 1) determines that the hydrogen supply system is operating normally, so that the hydrogen in the hydrogen storage unit 119 is directly supplied to the fuel cell stack 109.

However, in the case that the calculated temperature of the cooling water is not higher than the predetermined temperature (S210-No), the control unit 127 (FIG. 1) closes the first valve 121 (FIG. 1), and opens the second valve 123 (FIG. 1) and the third valve 125 (FIG. 1) (S220). When the first valve 121 (FIG. 1) is closed and the second valve 123 (FIG. 1) and the third valve 125 (FIG. 1) are open, the hydrogen in the hydrogen storage unit 119 (FIG. 1) is supplied to the regenerator 117 (FIG. 1). Aqueous hydride in the reactor/gas separator 103 (FIG. 1) then reacts so as to generate hydrogen at a high temperature. The hydrogen generated in the reactor/gas separator 103 (FIG. 1) is delivered to the heat exchanger 105 (FIG. 1) so that the high temperature heat contained in the hydrogen is transferred to the cooling water in the heat exchanger 105 (FIG. 1). Then the hydrogen passes through the third valve 125 (FIG. 1) and is supplied to the fuel cell stack 109 (FIG. 1).

Namely, when the temperature of the cooling water is lower than the predetermined temperature at ignition, hydrogen at a high temperature is generated so that heat contained in the hydrogen is transferred to the cooling water in the heat exchanger. Accordingly, a reaction in the fuel cell stack occurs easily and stably so that ignition performance is improved. Furthermore, hydrogen supplied from the hydrogen storage unit 119 (FIG. 1) is not consumed but instead is delivered to the fuel cell stack 109 (FIG. 1) so that hydrogen consumption for improving the performance at ignition is prevented.

The hydrogen supply system for a fuel cell according to the above embodiment of this invention can improve the performance at ignition by increasing the temperature of the cooling water using the heat from a reaction between a hydride and water. Furthermore, hydrogen that is used for the fuel cell is not consumed during ignition so that the fuel consumption rate is not increased.

Moreover, humidified hydrogen is supplied to the fuel cell stack so that the performance of the fuel cell is improved. In addition, the danger of hydrogen combustion is prevented.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A hydrogen supply system for a fuel cell, comprising:
    a hydrogen storage unit configured to store hydrogen;
    a hydride storage unit configured to store aqueous hydride;
    a reactor coupled to the hydride storage unit and configured to be supplied with aqueous hydride from the hydride storage unit, the reactor configured to react the supplied aqueous hydride to generate oxide and hydrogen;
    a heat exchanger coupled to the reactor and configured to be supplied with hydrogen from the reactor to transfer heat contained in the supplied hydrogen to a coolant circulating through a fuel cell stack;
    a regenerator also coupled to the reactor and configured to be supplied with oxide from the reactor and hydrogen from the hydrogen storage unit, where the regenerator is configured to react the supplied oxide and hydrogen, thereby generating an aqueous hydride;
    a first valve disposed inline between the hydrogen storage unit and the fuel cell stack and configured to control a supply of hydrogen from the hydrogen storage unit to the fuel cell stack;
    a second valve disposed inline between the hydrogen storage unit and the regenerator and configured to control a supply of hydrogen from the hydrogen storage unit to the regenerator;
    a third valve disposed inline between the heat exchanger and the fuel cell stack and configured to control a supply of hydrogen from the heat exchanger to the fuel cell stack;
    a temperature detector configured to detect a temperature of coolant flowing to the fuel cell stack and to generate a corresponding temperature signal; and
    a control unit configured to generate control signals for actuating the first valve, the second valve, and the third valve based on the temperature signal from the temperature detector.

2. The hydrogen supply system for a fuel cell according to claim 1, wherein the aqueous hydride is one of aqueous sodium borohydride ($NaBH_4$), aqueous lithium borohydride ($LiBH_4$), and aqueous sodium hydride ($NaH$).

3. The hydrogen supply system for a fuel cell according to claim 1, wherein if the temperature of the coolant is higher than a predetermined temperature, the control unit opens the first valve and closes the second valve and the third valve.

4. The hydrogen supply system for a fuel cell according to claim 1, wherein if the temperature of the coolant is not higher than a predetermined temperature, the control unit closes the first valve and opens the second valve and the third valve.

5. A hydrogen supply system for a fuel cell, comprising:
    a hydrogen storage unit;
    a hydride storage unit;
    a reactor coupled to said hydride storage unit and configured to generate oxide and hydrogen from hydride;
    a heat exchanger coupled to the reactor and configured to transfer heat contained in hydrogen supplied from the reactor to a coolant circulating through a fuel cell stack;
    a regenerator coupled to the reactor and the hydrogen storage unit and configured to be supplied with oxide from the reactor and hydrogen from the hydrogen storage unit, where the regenerator is configured to react the supplied oxide and hydrogen, thereby generating a hydride;
    a first valve disposed inline between the hydrogen storage unit and the fuel cell stack and configured to control a supply of hydrogen from the hydrogen storage unit to the fuel cell stack;
    a second valve disposed inline between the hydrogen storage unit and the regenerator and configured to control a supply of hydrogen from the hydrogen storage unit to the regenerator;
    a third valve disposed inline between the heat exchanger and the fuel cell stack and configured to control a supply of hydrogen from the heat exchanger to the fuel cell stack;
    a temperature detector configured to detect a temperature of the coolant flowing to the fuel cell stack and to generate a corresponding temperature signal; and
    a control unit configured to generate control signals for actuating the first valve, the second valve, and the third valve based on the temperature signal from the temperature detector.

6. The hydrogen supply system of claim 5, wherein the hydride is selected from a group consisting of: of aqueous sodium borohydride ($NaBH_4$), aqueous lithium borohydride ($LiBH_4$), and aqueous sodium hydride ($NaH$).

7. The hydrogen supply system of claim 5, wherein if the temperature of the coolant is higher than a predetermined temperature, the control unit opens the first valve and closes the second valve and the third valve.

8. The hydrogen supply system of claim 5, wherein if the temperature of the coolant is not higher than a predetermined temperature, the control unit closes the first valve and opens the second valve and the third valve.

* * * * *